United States Patent Office 3,428,088
Patented Feb. 18, 1969

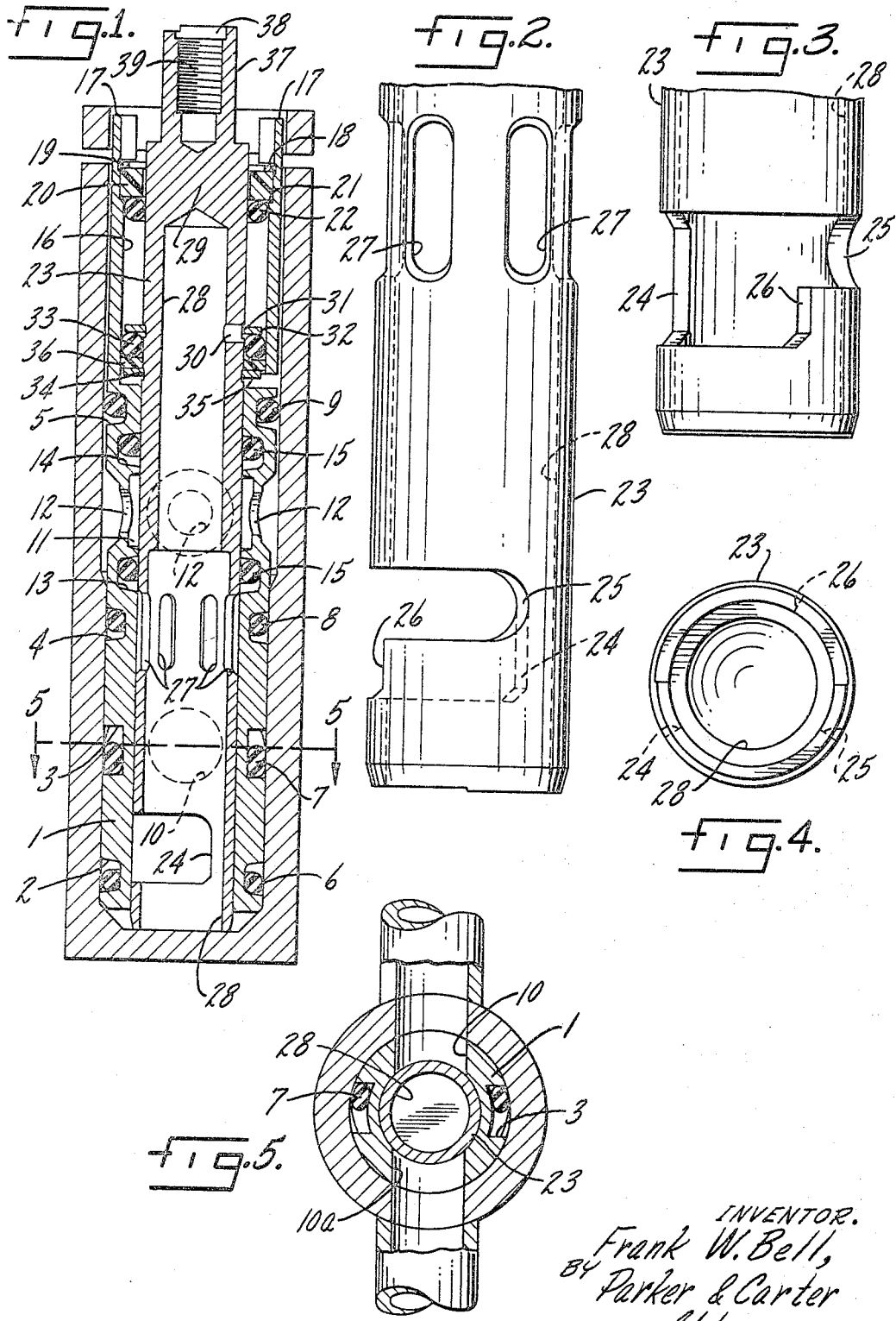

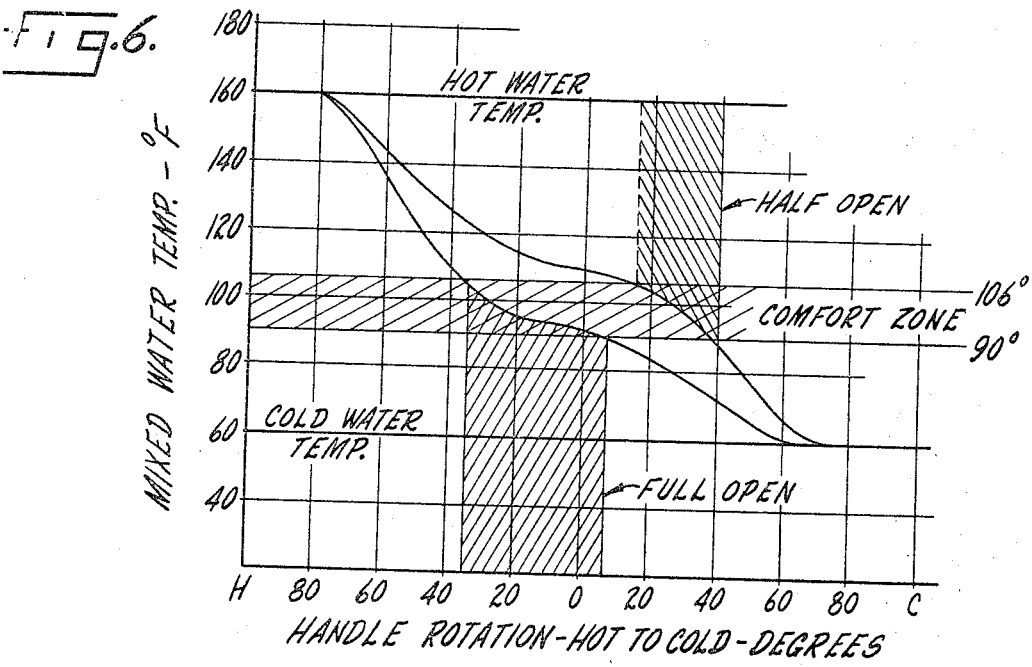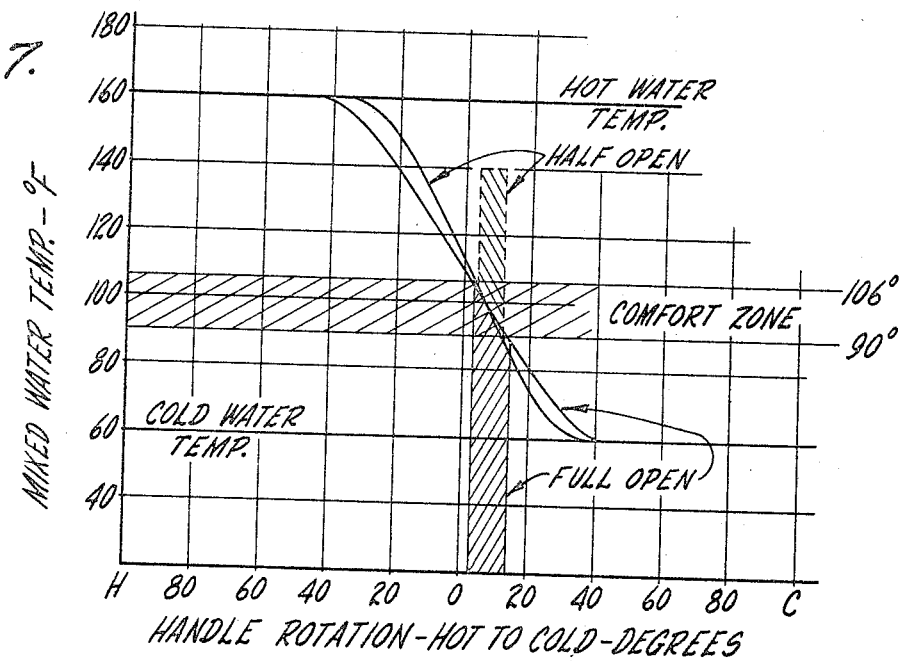

3,428,088
FAUCET VALVE MIXING NOTCH
Frank W. Bell, Avon, Ohio, assignor to Standard Screw Company, Bellwood, Ill., a corporation of New Jersey
Filed June 13, 1966, Ser. No. 557,174
U.S. Cl. 137—625.17         4 Claims
Int. Cl. F16k *11/06*

ABSTRACT OF THE DISCLOSURE

A mixing valve which includes a housing having two spaced inlet ports and discharge port means. Within the housing there is a hollow mixing valve stem which is both rotatable and reciprocal. Rotation of the valve stem controls water temperature, whereas reciprocation of the valve stem controls water volume. The valve stem has an inlet opening which is so shaped, relative to the positions of the housing hot and cold water ports that, upon rotation of the stem, the quantity of cold water entering the stem decreases at a slower rate than the rate at which the hot water increases.

---

This invention relates to a mixing valve and faucet construction. It has for one object to provide a means for permitting a greater degree of valve movement, particularly in rotation, without causing too sudden temperature change in the stream of mixed hot and cold water flowing through the valve.

Another object of the invention is to provide a mixing valve in which the inlet to the valve member is shaped to avoid extreme delicacy of operation. It is recognized that in a mixing valve where hot and cold water are to be mixed, it is preferable, if the device is so proportioned or otherwise so arranged, that considerable movement of the control handle is possible before extremely hot water will be discharged from the faucet. If the adjusting movement of the handle is delicate in the sense that great temperature change takes place for relatively slight handle movement, the faucet in which the valve is included is likely to be unsatisfactory because a user will get extremely hot water when only comfortably hot water is desired. It is an object of this invention, therefore, to provide means in the valve whereby the cold water entering for mixing decreases at a slower rate than does the hot water entering for mixing. The amount of movement of the control handle which will cause mixing at temperatures from 90° F. to 106° F. is increased by the structure of this invention. For purposes of illustration, the temperature ranges of the mixed water from 90° F. to 106° F. may be considered the "comfort zone." It is a purpose of this invention to expand the "comfort zone" and as shown in the drawings, the "comfort zone" is expanded by the structure of the present invention to permit almost 80° of rotation of the handle while in a conventional valve construction, the "comfort zone" is maintained in only about 15° of rotary movement of the handle.

The invention is illustrated diagrammatically in the accompanying drawings wherein:

FIGURE 1 is a longitudinal section of one form of the device on an enlarged scale, FIGURE 2 is a partial side elevation of the movable valve member on a further enlarged scale, FIGURE 3 is a side elevation of a portion of the member shown in FIGURE 2, FIGURE 4 is an end view of the valve member of FIGURE 3, FIGURE 5 is a section taken at line 5—5 of FIGURE 1, FIGURE 6 is a graph illustrating the effect of the mixing notch of the moving valve member on the flow of water, and FIGURE 7 is a similar graph showing the effect of the use of a different form of mixing notch in the valve member of the invention on the flow of water.

Like numerals will be used to describe like parts in the following description of the invention.

The valve of this invention is shown generally in assembly in FIGURE 1. It includes a cylindrical sleeve 1, open at both ends and exteriorly grooved at 2, 3, 4 and 5. In each of these grooves is positioned a sealing ring 6, 7, 8 and 9 respectively. The grooves 3, as generally indicated in FIGURE 1, may extend diagonally about the sleeve 1. The grooves 2, 4 and 5 are substantially circumferential and receive conventional O-rings.

The sleeve is provided with inlet openings 10, 10*a* through which hot and cold water respectively is discharged into the sleeve. The sleeve is also provided internally with an enlarged portion 11 from which one or more outlets 12 are provided for a discharge of fluid. The sleeve is internally grooved at 13 and 14 and receives in these grooves O-rings 15. The sleeve is internally enlarged adjacent one end, as indicated at 16, and is provided at one end with ears or extensions 17, 17. These ears are notched or grooved at 18 to receive a retaining ring 19. A packing ring 20 is positioned in contact with the ring 19 and it may contact a shoulder 21 formed within the sleeve. An O-ring 22 is positioned within the space 16 and generally in contact with the ring 22 and with the hollow valve stem which is described below.

There is received within the sleeve 1 for rotation and reciprocation a hollow valve stem 23. This valve stem is open at one end and is provided with an inlet port or mixing notch which, as shown in FIGURE 2 in particular, extends about the valve stem 23 and is of a plurality of different widths. This is shown particularly in FIGURE 3. The inlet port has its maximum width at 24 and its minimum width at 25. The portions of two diameters meet at a shoulder 26, as shown particularly in FIGURE 3. The valve stem is provided with one or more outlets 27 intermediate its ends and these outlet openings will be in register with the enlargement 11 of the sleeve 1 which is in communication with the outlet passage 12.

As shown particularly in FIGURE 1, the valve stem 23 is provided with a hollow portion 28 and a closed end 29. An opening or passage 30 extends from the interior of the stem to a groove 31 in the exterior of the stem. A snap or fastening ring 32 is positioned in the gorove 31 and is generally in contact with an O-ring 33. The stem 23 is also exteriorly grooved at 34 and receives a snap or fastening ring 35. A packing ring 36 is positioned exteriorly of the stem and in contact with the ring 35 and the O-ring 33. At its exposed end, the stem is reduced as at 37 and is shaped to receive an operating handle by means of which it is rotated and reciprocated. An external hollow portion 38 may be formed from the exterior end of the sleeve and it may be internally threaded as at 39.

The graphs of FIGURES 6 and 7 illustrate the operation and advantages of using the special inlet port including the notch defined by the member 26 of FIGURES 2 and 3. FIGURE 6 illustrates graphically the operation of the valve in a mixing faucet. Hot and cold water are discharged into the valve and are mixed in it and are discharged from it and from the faucet in which it is located. The mixing and the discharge of the water are controlled by the position of the hollow valve stem 23.

FIGURE 7 illustrates graphically the comparable and less satisfactory conditions which prevail in a faucet in which the valve stem is provided with an inlet opening of uniform diameter. This type of valve stem would not have the notch 26 and the inlet passage or opening or port 24 would be of uniform width. The operation of such a valve is illustrated in FIGURE 7 for purposes of comparison with the operation of the valve of this invention, which operation is illustrated in FIGURE 6 as above pointed out.

In the use of a valve of the sort shown in FIGURE 7 in a single handle mixing faucet, obviously suitable mixing conditions can be accomplished by careful and even delicate rotation of the handle which controls the hollow valve stem. This, however, is not the most satisfactory condition of operation where a delicate and accurate setting must be made to prevent too rapid change to the discharge of extremely hot water from the faucet. A user is always likely to operate the valve hurriedly and carry rotation in the "hot" direction too far or to accomplish it too quickly. This will result in unpleasant and even dangerously hot discharge of water from the faucet. It is to avoid this unhappy result that the special notched inlet port is formed in the valve stem in the path of entering water.

Experience has shown that generally users prefer water varying from 90° F. to 106° F. This may be called the "comfort zone." If water is discharged from the faucet at a temperature no greater than 106° F., it will not be excessively hot and the user will not be made uncomfortable nor subjected to danger.

The two graphs of FIGURES 6 and 7 illustrate in the column at the left of each figure, the temperatures of the water. The graphs indicate in the scale at the bottom of each, the degrees or rotation of the handle, which, being fixed to the valve stem, rotates it through an identical arc.

From an inspection of FIGURES 6 and 7, it is clear that in the case of a faucet in which the inlet opening of the valve stem is of uniform width, only a very slight rotation of the handle will accomplish rotation of the valve stem sufficiently to move it quickly through the "comfort zone" and hence the operation of a valve of the type indicated in FIGURE 7 is delicate and easily susceptible to improper use or even dangerous use. The degree of rotation to carry the hollow valve stem through the "comfort zone" is of the order of 15° of rotation.

In distinction to the operation of the device whose conditions are indicated in FIGURE 7, the operation of the device of this invention permits a rotation of over 75° while retaining the operation of the valve in the "comfort zone." This is obviously advantageous because a user may operate the valve with little or no danger of suddenly finding himself subjected to dangerously hot water as a result of a very slight rotation of the handle.

It is recognized that the faucet may be opened only partially or it may be opened fully. This is accomplished by reciprocation of the valve stem to bring the inlet port partly or fully in register with the water inlet openings 10, 10a. Since the inlet port does not extend completely around the valve stem but actually, as shown in FIGURE 4, only through approximately one-half its circumference, rotation of the stem will bring the inlet port to a greater or lesser degree of register with the hot and cold inlet openings of the valve stem, the user may therefore control the temperature at which the mixed hot and cold water will be discharged from the faucet. The mixed water passes upwardly through the valve stem and emerges from the outlet ports 27 of the stem and the outlet ports 12 of the sleeve to the final outlet passage which leads to a spout.

Because of the shape of the valve stem inlet port shown particularly in FIGURES 2 and 3, when the valve is turned toward the hotter range so as to discharge hotter water from the faucet, the hot water is entering the smaller width slot 25 above the notch 26 and decreasing the relative amount of cold water entering through the wider slot 24. The relationship of the widths is best shown in FIGURE 3. Because of the area of the openings determined by the notch 26 and by its location, the cold water entering the valve stem decreases at a slower rate than the hot water increases.

This relationship requires a greater turning of the handle to get really hot water from the faucet than would be the case where a valve stem having an inlet opening of constant widths is used.

In reference of FIGURES 6 and 7, it has been pointed out that the faucet, when the valve stem is rotated for mixing, may be fully opened or partly opened. These two possible conditions are shown in the graphs and it is indicated upon each how much movement in rotation is possible without departing from the "comfort zone." Clearly the rotation which is possible within the range of the "comfort zone" is in each case greater when the faucet is fully open than it is when the faucet is only partly open. This rotation of the valve stem in the structure of the present invention when the faucet is only half open may be carried out for approximately 22°. In the case of the more conventional valve construction illustrated in FIGURE 7, rotation is possible for only a little more than 5°. Where the faucet is fully open in the form of the device of the present invention as illustrated in the graph of FIGURE 6, rotation of the valve stem within the "comfort zone" is possibly throughout slightly more than 40°, while in the case of the more conventional valve stem construction shown in FIGURE 7, rotation within the "comfort zone" is only about 10°. Clearly therefore the construtcion of the valve stem and particularly of its inlet port, as illustrated in FIGURES 2 and 3, permits a vastly greater rotation of the valve stem for temperature control while retaining the action of the faucet as a whole within the "comfort zone."

It should be noticed that in the structure of the present invention, the "half open" and the "full open" conditions do not overlap. This relationship permits a greater amount of rotation. In the case of the more conventional inlet port arrangement, the "half open" and the "full open" conditions completely overlap so that under no condition in the case of the structure whose operation is illustrated in FIGURE 7 can the valve stem be rotated more than about 10° while continuing operation of the device in the "comfort zone."

The use and operation of the invention are as follows:
The valve stem is reciprocated to open and to close the valve or to move it to an adjusted position intermediate that of full closed or full open. The valve stem is rotated to control the temperature of the water which enters and it may be moved to a position of "all cold" or "all hot" or an intermediate position for a tempered flow of water.

The particular construction of the inlet port in the valve stem which provides a plurality of widths of this inlet port permits easy and safe operation of the valve in the "hot" direction and avoids danger and reduces the delicacy of operation required in other types of hollow valve stems.

Whereas the preferred form of the invention has been illustrated and described, it should be realized that there are many modifications, substitutions and alterations thereto within the scope of the following claims.

In particular, the inlet port need not be formed with only two widths, such as those defined by the wider portion 24 and the narrower portion 25. The shoulder or notch member 26 defines the point at which the narrower and wider portions of the inlet port meet and provides a convenient method of construction and manufacture. For the purpose of this invention however, it is sufficient that the inlet port of the valve stem 23 shall have a plurality of widths.

The inlet port, for the purpose of this invention, could be made with a plurality of widths not limited to the two widths illustrated in the figures. The inlet port could be "stepped" in the sense that it would have notches or shoulders comparable to the member 26 which would provide additional widths for the inlet port since they would be of different heights each from the other. Thus an inlet port of two, three, four or even more widths is within the contemplation of this invention.

Instead of shoulders or notches comparable to the member 26, the inlet port might have its lower portion formed in a curve rather than in one or more notches.

The result of the provision of one or more notches or shoulders such as the member 26 and the result of the formation of the inlet port with a curved lower margin as just mentioned is to provide an inlet port which has a progressively decreasing width and hence has a construction which will present to the hot and cold water inlet ports in the housing a progressively increasing or decreasing area depending upon the relative rotational position of the valve stem 23 and the housing.

I claim:

1. In a mixing valve, a housing having spaced inlet ports, one of said ports being adapted for hot water input, and the other being adapted for cold water input, discharge port means in said housing, a reciprocal and rotatable valve stem in said housing, with reciprocation controlling water volume and rotation controlling water temperature, said valve stem having an inlet opening movable into communication with said inlet ports, an output from said valve stem, said valve stem inlet including means, effective during stem rotation, for causing the quantity of water entering from the cold water inlet port to decrease at a slower rate than the rate at which water entering from the hot water port increases.

2. The structure of claim 1 further characterized in that said stem inlet opening is arcuate, and has portions of varying extent in the direction of the stem axis.

3. The structure of claim 2 further characterized in that the stem inlet portions of lesser extent are positioned adjacent the hot water inlet.

4. The structure of claim 1 further characterized in that said stem inlet opening is arcuate in shape, with a portion of less axial extent being adjacent the hot water inlet, and a portion of greater axial extent being positioned adjacent the cold water inlet.

References Cited

UNITED STATES PATENTS

| | | | |
|---|---|---|---|
| 1,313,105 | 8/1919 | Moran | 251—209 |
| 1,493,133 | 5/1924 | Sykora | 251—209 |
| 1,792,906 | 2/1931 | Heilos | 251—209 |
| 2,937,656 | 5/1960 | Evans et al. | 137—117 |
| 3,211,181 | 10/1965 | Fraser et al. | 137—625.17 |
| 3,285,278 | 11/1966 | Corlett | 137—625.17 |
| 3,358,714 | 12/1967 | Moen | 137—625.17 |

M. CARY NELSON, *Primary Examiner.*

W. R. CLINE, *Assistant Examiner.*

Disclaimer 3,428,088.—*Frank W. Bell*, Avon, Ohio. FAUCET VALVE MIXING NOTCH. Patent dated Feb. 18, 1969. Disclaimer filed July 22, 1985, by the assignee, *Stanadyne, Inc.*

Hereby enters this disclaimer to claims 1-4 of said patent.

[*Official Gazette August 5, 1986.*]